(12) United States Patent
Kondo et al.

(10) Patent No.: US 10,810,733 B2
(45) Date of Patent: Oct. 20, 2020

(54) DEFECT CLASSIFICATION APPARATUS AND DEFECT CLASSIFICATION METHOD

(71) Applicant: HITACHI HIGH-TECHNOLOGIES CORPORATION, Tokyo (JP)

(72) Inventors: Naoaki Kondo, Tokyo (JP); Takehiro Hirai, Tokyo (JP); Minoru Harada, Tokyo (JP); Yuji Takagi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 129 days.

(21) Appl. No.: 16/090,991

(22) PCT Filed: May 24, 2016

(86) PCT No.: PCT/JP2016/065299
§ 371 (c)(1),
(2) Date: Oct. 3, 2018

(87) PCT Pub. No.: WO2017/203600
PCT Pub. Date: Nov. 30, 2017

(65) Prior Publication Data
US 2019/0139210 A1 May 9, 2019

(51) Int. Cl.
*G06K 9/00* (2006.01)
*G06T 7/00* (2017.01)
(Continued)

(52) U.S. Cl.
CPC ............ *G06T 7/001* (2013.01); *G01N 23/225* (2013.01); *G06K 9/42* (2013.01); *G06K 9/627* (2013.01);
(Continued)

(58) Field of Classification Search
CPC .................. G06T 7/001; G06T 7/0004; G06T 2207/30148; G06T 2207/10061;
(Continued)

(56) References Cited

U.S. PATENT DOCUMENTS 5,400,135 A * 3/1995 Maeda .................. G01N 21/88
356/239.1
5,440,649 A * 8/1995 Kiyasu ............... G01N 21/8851
382/147
(Continued)

FOREIGN PATENT DOCUMENTS

JP 05-149728 A 6/1993
JP 11-282822 A 10/1999
(Continued)

OTHER PUBLICATIONS

Korean Office Action dated Dec. 13, 2019 for the Korean Patent Application No. 10-2018-7026379.

*Primary Examiner* — Amir Alavi
(74) *Attorney, Agent, or Firm* — Volpe and Koenig, P.C.

(57) ABSTRACT

Provided is a defect classification apparatus classifying images of defects of a sample included in images obtained by capturing the sample, the apparatus including an image storage unit for storing the images of the sample acquired by an external image acquisition unit, a defect class storage unit for storing types of defects included in the images of the sample, an image processing unit for extracting images of defects from the images from the sample, processing the extracted images of defects and generating a plurality of defect images, a classifier learning unit for learning a defect classifier using the images of defects of the sample extracted by the image processing unit and data of the plurality of generated defect images, and a defect classification unit for processing the images of the sample by using the classifier learned by the classifier learning unit, to classify the images of defects of the sample.

6 Claims, 21 Drawing Sheets

(51) Int. Cl.
*G01N 23/225* (2018.01)
*G06K 9/62* (2006.01)
*G06K 9/42* (2006.01)

(52) U.S. Cl.
CPC .......... *G06K 9/6255* (2013.01); *G06K 9/6262* (2013.01); *G01N 2223/401* (2013.01); *G01N 2223/6116* (2013.01); *G06T 2207/10061* (2013.01); *G06T 2207/20081* (2013.01); *G06T 2207/30148* (2013.01)

(58) Field of Classification Search
CPC .......... G06T 2207/20081; G06K 9/42; G06K 9/6262; G06K 9/627; G06K 9/00718; G06K 9/00797; G06K 9/6255; G06F 17/30257; G06F 17/3024; G01N 23/225; G01N 2223/401; G01N 2223/6116; G01N 21/95607; G01N 21/9501; H04N 1/40062
See application file for complete search history.

(56) References Cited

U.S. PATENT DOCUMENTS

| | | | |
|---|---|---|---|
| 5,463,459 A | 10/1995 | Morioka et al. | |
| 5,917,332 A * | 6/1999 | Chen | G01R 31/311 324/750.02 |
| 6,292,582 B1 * | 9/2001 | Lin | G01N 21/95607 257/E23.179 |
| 6,483,938 B1 * | 11/2002 | Hennessey | G01N 21/95607 257/E21.525 |
| 8,379,965 B2 * | 2/2013 | Iwanaga | G01N 21/8851 382/149 |
| 9,710,203 B2 * | 7/2017 | Van Acquoij | B41J 29/38 |
| 10,650,508 B2 * | 5/2020 | Chang | G06K 9/66 |
| 10,699,926 B2 * | 6/2020 | Plihal | G01N 21/9501 |
| 2003/0202703 A1 | 10/2003 | Ogi | |
| 2009/0208090 A1 | 8/2009 | Nishiura et al. | |
| 2013/0222574 A1 | 8/2013 | Nakagaki et al. | |
| 2014/0072204 A1 | 3/2014 | Minekawa et al. | |
| 2014/0307946 A1 | 10/2014 | Nakahira et al. | |
| 2019/0139210 A1 * | 5/2019 | Kondo | G06T 7/001 |

FOREIGN PATENT DOCUMENTS

| | | |
|---|---|---|
| JP | 2000-099727 A | 4/2000 |
| JP | 2000-105203 A | 4/2000 |
| JP | 2003-317082 A | 11/2003 |
| JP | 2006-048370 A | 2/2006 |
| JP | 2006-337152 A | 12/2006 |
| JP | 2009-164436 A | 7/2009 |
| JP | 2012-083147 A | 4/2012 |
| JP | 2012-225768 A | 11/2012 |
| JP | 2014-207110 A | 10/2014 |

* cited by examiner

IMAGE OBTAINED BY ROTATING IMAGE OF DETECTOR 302 BY 90 DEGREES IN CLOCKWISE DIRECTION

1302

IMAGE OBTAINED BY ROTATING IMAGE OF DETECTOR 303 BY 90 DEGREES IN CLOCKWISE DIRECTION

1303

IMAGE OBTAINED BY ROTATING IMAGE OF DETECTOR 304 BY 90 DEGREES IN CLOCKWISE DIRECTION

1304

1401

1402

1403

IMAGE OBTAINED BY HORIZONTALLY
INVERTING IMAGE OF DETECTOR 304

1404

IMAGE OBTAINED BY PERFORMING
DEFECT CLASS UNCHANGEABLE
DEFORMATION TO IMAGE OF
DETECTOR 301

1501

IMAGE OBTAINED BY PERFORMING
DEFECT CLASS UNCHANGEABLE
DEFORMATION TO IMAGE OF
DETECTOR 302

1502

FIG. 15C
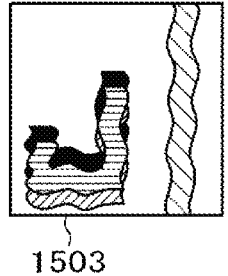
IMAGE OBTAINED BY PERFORMING
DEFECT CLASS UNCHANGEABLE
DEFORMATION TO IMAGE
OF DETECTOR 303
1503
FIG. 15D
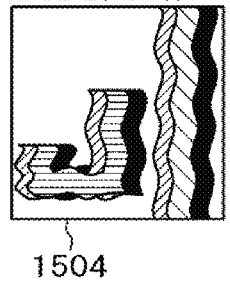
IMAGE OBTAINED BY PERFORMING
DEFECT CLASS UNCHANGEABLE
DEFORMATION TO IMAGE OF
DETECTOR 304
1504
FIG. 16
| IMAGE TYPE | DEFECT ID | IMAGE ID | CHANNEL INFORMATION | IMAGE ID BEFORE PROCESSING | ... |
|---|---|---|---|---|---|
| CAPTURED IMAGE | D_07 | 701 | DETECTOR 301 | – | |
| | | 702 | DETECTOR 302 | – | |
| | | 703 | DETECTOR 303 | – | |
| | | 704 | DETECTOR 304 | – | |
| | | 705 | DETECTOR 305 | – | |
| | | : | : | : | |
1601　1602　1603　1604　1605　1600

| IMAGE TYPE | DEFECT ID | IMAGE ID | CHANNEL INFORMATION | IMAGE ID BEFORE PROCESSING | ... |
|---|---|---|---|---|---|
| PROCESSED IMAGE | D_13 | 1301 | DETECTOR 301 | 701 | |
| | | 1302 | DETECTOR 302 | 702 | |
| | | 1303 | DETECTOR 303 | 703 | |
| | | 1304 | DETECTOR 304 | 704 | |
| | | 1305 | DETECTOR 305 | 705 | |
| | ⋮ | ⋮ | ⋮ | ⋮ | |

1701 1702 1703 1704 1705  1700

| IMAGE TYPE | DEFECT ID | IMAGE ID | CHANNEL INFORMATION | IMAGE ID BEFORE PROCESSING | ... |
|---|---|---|---|---|---|
| PROCESSED IMAGE | D_13 | 1301 | DETECTOR 302 | 701 | |
| | | 1302 | DETECTOR 303 | 702 | |
| | | 1303 | DETECTOR 304 | 703 | |
| | | 1304 | DETECTOR 301 | 704 | |
| | | 1305 | DETECTOR 305 | 705 | |
| | ⋮ | ⋮ | ⋮ | ⋮ | |

1801 1802 1803 1804 1805  1800

EXTRACTED IMAGE OF DEFECT PORTION
(IMAGE OF DETECTOR 301)

1901

1902

1903

1904

DEFECT CLASSIFICATION APPARATUS AND DEFECT CLASSIFICATION METHOD

TECHNICAL FIELD

The present invention relates to a defect classification apparatus classifying various types of defects generated in a manufacturing line of semiconductor wafers and, more specifically, to a defect classification apparatus and a defect classification method including a method and a unit for processing images captured by an image-capturing apparatus and learning a classifier by using the captured images and the processed images.

BACKGROUND ART

In the manufacture of semiconductor wafers, it is important to rapidly establish a manufacturing process and to swift to amass production system at a high yield in order to secure profit. For this purpose, various types of inspection and measurement devices have been introduced into the manufacturing line.

As a representative inspection device, there is an optical wafer inspection device. For example, JP-A-2000-105203 (PTL 1) discloses techniques in which an optical image of a wafer surface is captured by a bright-field illumination and is compared with an image of a good portion (for example, an image of an adjacent chip) to inspect a defect.

However, such an optical inspection device is influenced by the illumination wavelength and the resolution limit of the acquired image is about several hundred nanometers. Therefore, it is only possible to detect presence/absence of defects on the order of several tens of nanometers on the wafer. When detailed defect analysis is performed, a separate defect observation device or the like having higher imaging resolution is necessary.

The defect observation device is a device for capturing a defect position on the wafer using the output of the inspection device and outputting an image, and an observation device using a scanning electron microscope (SEM) (hereinafter, referred to as review SEM) is widely used. In the mass production line of semiconductors, automation of observation operation is desirable. The review SEM includes a function that performs automatic defect review (ADR) for automatically collecting images at defect positions in a sample and a function that performs automatic defect classification (ADC) for automatically classifying images collected by ADR.

As an automatic classification method of images collected by ADR, a method of processing images to be classified and classifying the processed images is disclosed in JP-A-2012-83147 (PTL 2). In addition, a method of deforming design information by comparing with images to be classified and classifying the images to be classified based on the deformed design information is disclosed in JP-A-2009-164436 (PTL 3).

CITATION LIST

Patent Literature

PTL 1: JP-A-2000-105203
PTL 2: JP-A-2012-83147
PTL 3: JP-A-2009-164436

SUMMARY OF INVENTION

Technical Problem

There are many defect classes (types) generated in the manufacturing line of semiconductor wafers, and variation in shape and brightness may be included even in one class. In order to improve classification performance of ADC to a desired accuracy in a short period of time, it is necessary to sufficiently prepare image data of each defect class and to learn variation of the characteristics of each defect class in a classifier for classifying the image data. However, in the manufacturing line of the semiconductor wafers, since there are defects generated infrequently, it takes a time to improve classification performance of the classifier to the desired accuracy.

PTL 2 discloses a method of processing a plurality of images captured by a plurality of types of image-capturing apparatuses to be similar to each other and classifying the processed images, but does not describe a method of using the processed images to learn the classifier.

In addition, PTL 3 discloses a method of deforming design information, comparing images to be classified with the deformed design information and classifying the images to be classified, but does not describe a method of learning the classifier by using the deformed design information.

In order to improve classification performance of ADC to a desired accuracy in a short period of time, it is necessary to sufficiently prepare image data of each defect class and to learn variation of the characteristics of each defect class in a classifier for classifying the image data. However, in the manufacturing line of the semiconductor wafers, since there are defects generated infrequently, it takes time to improve classification performance of the classifier to the desired accuracy.

The present invention is to solve the problems of the techniques of the related arts described above and to provide an automatic defect classification apparatus (hereinafter, referred to as a defect classification apparatus) and an automatic defect classification method (hereinafter, referred to as a defect classification method), which are capable of increasing variation of image data used to learn a classifier and improving classification performance of the classifier to a desired accuracy in a short period of time, by processing captured image data even when a small amount of defect image data is captured by an image-capturing apparatus.

Solution to Problem

In order to solve the above-described problems, the present invention provides a defect classification apparatus classifying images of defects of a sample included in images obtained by capturing the sample, and including an image storage unit for storing the images of the sample acquired by an external image acquisition unit; a defect class storage unit for storing types of defects included in the images of the sample; an image processing unit for extracting images of defects from the images from the sample stored in the image storage unit, processing the extracted images of defects and generating a plurality of defect images; a classifier learning unit for learning a defect classifier using the images of defects of the sample extracted by the image processing unit and data of the plurality of generated defect images, and a defect classification unit for processing the images of the sample stored in the image storage unit by using the classifier learned by the classifier learning unit to classify the images of defects of the sample.

In addition, the present invention provides a defect classification method classifying images of defects of a sample included in images obtained by capturing the sample, and including steps of storing the images of the sample acquired by an external image acquisition unit in an image storage unit; storing types of defects included in the images of the sample in a defect class storage unit; processing the images of the sample stored in the image storage unit by an image processing unit to extract images of defects from the images from the sample and processing the extracted images of defects to generate a plurality of defect images; learning a defect classifier using the images of defects of the sample extracted by the image processing unit and data of the plurality of generated defect images, by a classifier learning unit; and processing the images of the sample stored in the image storage unit by using the classifier learned by the classifier learning unit in the defect classification unit and classifying the images of defects of the sample.

Advantageous Effects of Invention

According to the present invention, it is possible to increase variation of image data used to learn a classifier and to improve classification performance of the classifier to a desired accuracy in a short period of time by processing captured image data even when a small amount of defect image data is captured by an image-capturing apparatus.

The problems, configurations and effects other than those described above become apparent by the description of the following embodiments.

BRIEF DESCRIPTION OF DRAWINGS

FIG. 15C illustrates an image illustrating an example of the result of performing defect class unchangeable deformation to an image of the detector 303 in the defect classification apparatus according to Embodiment 1 of the invention.

FIG. 15D illustrates an image illustrating an example of the result of performing defect class unchangeable deformation to an image of the detector 304 in the defect classification apparatus according to Embodiment 1 of the invention.

FIG. 16 is a table illustrating an example of accompanied information of a captured image before image processing in the defect classification apparatus according to Embodiment 1 of the invention.

DESCRIPTION OF EMBODIMENTS

Figure 1:
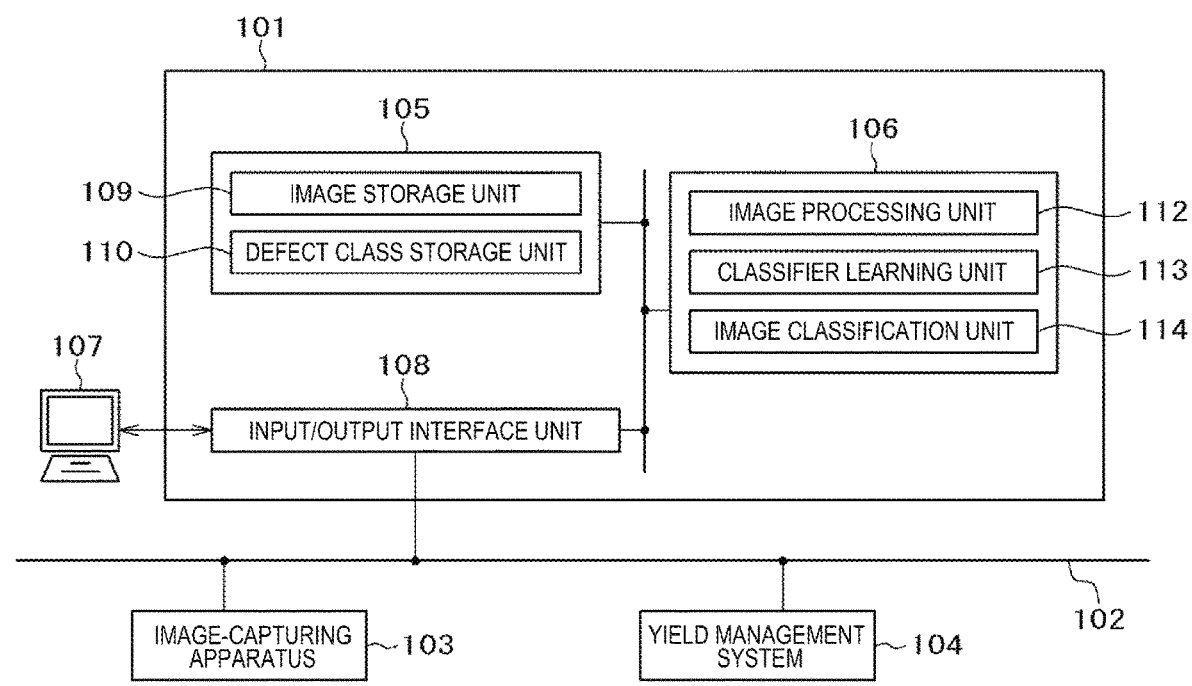
FIG. 1 is a block diagram illustrating the configuration of a defect classification apparatus according to Embodiment 1 of the present invention.

In the present invention, a plurality of images obtained by simultaneously capturing the same position of a sample with an image-capturing apparatus such as scanning electron microscope including a plurality of detectors are processed by an image classification apparatus to increase the number of images, thereby obtaining a large amount of learning images with various variations in a short period of time. Then, the learning condition of the classifier of the image classification apparatus is changed using the large amount of learning images to master the learning condition (classification parameter) of the classifier in a short period of time.

In addition, in the invention, in the defect classification apparatus for classifying various types of defects generated in the manufacturing line of semiconductor wafers, the captured images of a plurality of channels captured by a plurality of detectors of the image-capturing apparatus are processed, and the classifier is learned using the captured images and the images obtained by processing.

Therefore, in the invention, the classification apparatus of the defect image includes a unit for performing processing such as rotation or inversion to the images of the plurality of channels captured by the plurality of detectors of the image-capturing apparatus, a unit for renewing channel information accompanying the images processed according to the processing process, and a unit for learning the classifier by using the captured images and the processed images.

Hereinafter, the embodiments of the present invention will be described in detail with reference to the drawings. In the drawings describing the present embodiment, elements having the same function are denoted by the same reference numerals, and the repeated description thereof is omitted in principle. However, the present invention is not to be construed as being limited to the description of the following embodiments of the invention. It is easily understood by a person skilled in the art that the specific configuration can be changed in the range of not deviating from the spirit and scope of the present invention.

Embodiment 1

FIG. 1 illustrates a defect classification apparatus 101 according to the present invention. FIG. 1 also illustrates an image-capturing apparatus 103 that transmits and receives information to and from the defect classification apparatus 101 through communication unit 102, and a yield management system 104. Details of the image-capturing apparatus 103 will be described below using FIG. 2.

The yield management system 104 receives defect coordinates output from a wafer inspection device (not illustrated) as described in PTL 1, images output from the image-capturing apparatus 103 and defect class (defect type) information output from the defect classification apparatus 101, and transmits the defect coordinates according to a request from the image-capturing apparatus 103 and the images according to a request from the defect classification apparatus 101.

The defect classification apparatus 101 has a function for classifying the images acquired by the image-capturing apparatus 103 and transmitting the results to the yield management system 104. Details of the defect classification apparatus 101 will be described below.

In the defect classification apparatus 101, a storage unit 105, a computing unit 106, and an input/output interface unit 108, which is connected to an input/output unit 107 including a keyboard, a mouse, a display or the like for presenting data to an operator and receiving input from the operator, are connected via a communication unit 111.

The storage unit 105 includes an image storage unit 109 for storing acquired images, and a defect class storage unit 110 for storing defect classes. In addition, the computing unit 106 includes an image processing unit 112 for processing captured images, a classifier learning unit 113 for learning the classifier based on the defect classes of the captured images and the processed images, and an image classification unit 114 for classifying the images, which are described later.

Figure 2:
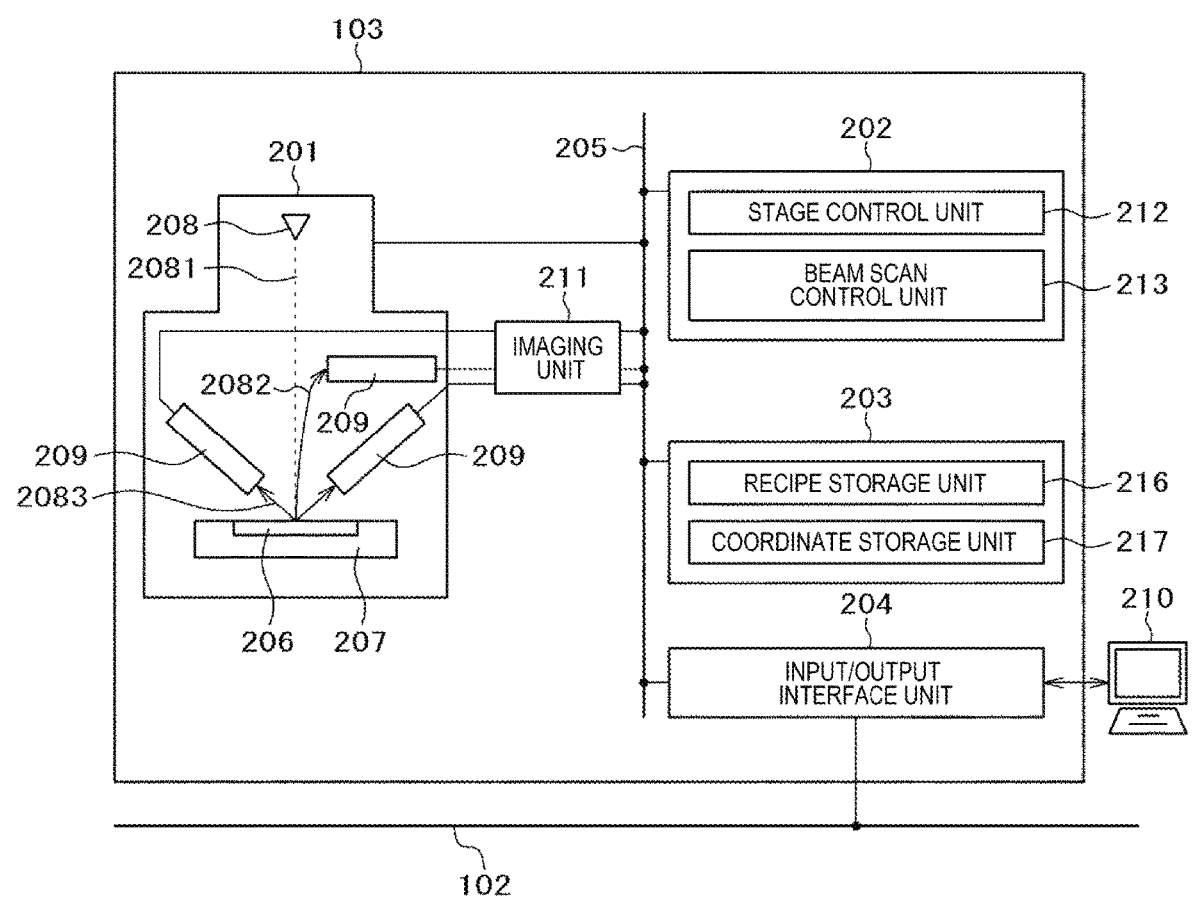
FIG. 2 is a block diagram illustrating the configuration of an image-capturing apparatus according to Embodiment 1 of the invention.

Details of the image-capturing apparatus 103 will be described using FIG. 2. In the image-capturing apparatus 103, a scanning electron microscope (SEM) 201, a control unit 202 for performing overall control, a storage unit 203 for storing information in a magnetic disk or a semiconductor memory or the like, an input/output interface unit 204, and an imaging unit 211 for imaging signals acquired from a detector 209 are connected via a communication unit 205.

The scanning electron microscope 201 includes a stage 207 on which a sample wafer 206 is placed, an electron source 208 for irradiating primary electron beams to the sample wafer 206, a plurality of detectors 209 for detecting secondary electrons and backscattered electrons generated by irradiation of the primary electron beams to the sample wafer 206 by the electron source 208, an electron lens (not illustrated) for converging the electron beams on the sample and a deflector (not illustrated) for scanning the electron beams onto the sample wafer.

In addition, the control unit 202 includes a stage control unit 212 and a beam scan control unit 213. The storage unit 203 includes a recipe storage unit 216 and a coordinate storage unit 217. The input/output interface unit 204 is connected with an input/output unit 210 including a keyboard, a mouse, a display or the like.

Figure 3:
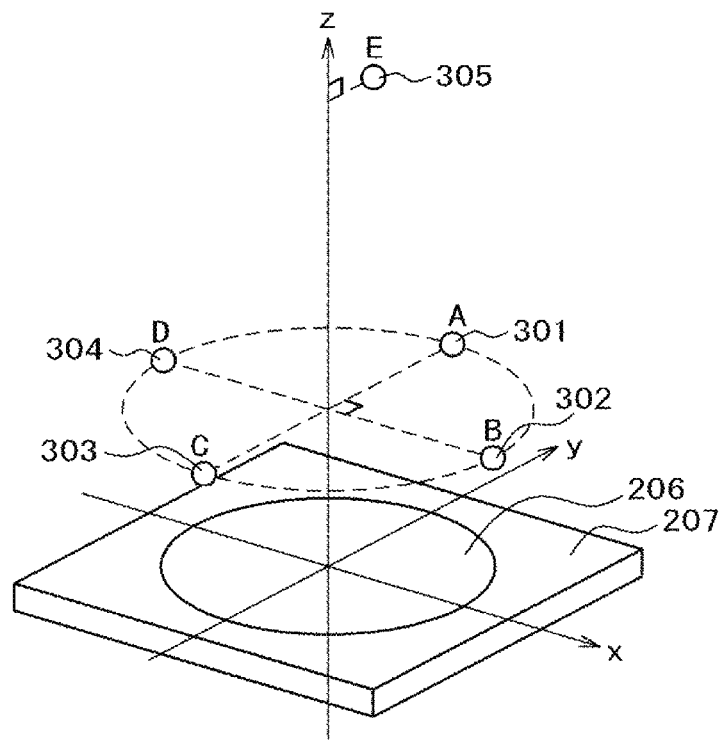
FIG. 3 is a perspective view of detectors and a sample wafer placed on a stage, which illustrates an example of arranging the detectors of the image-capturing apparatus according to Embodiment 1 of the invention.
Figure 4:
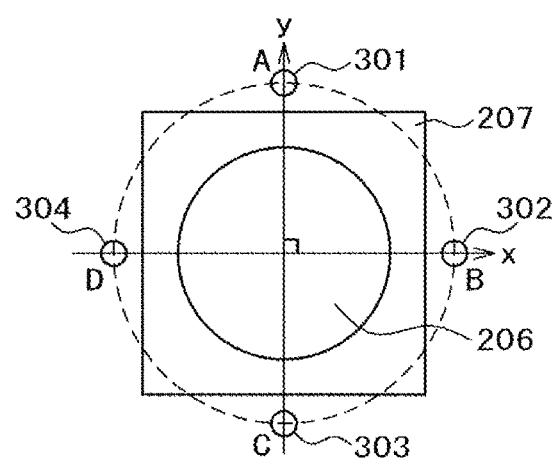
FIG. 4 is a plan view of the detectors and the sample wafer placed on the stage when viewing the arrangement of the detectors of the image-capturing apparatus according to Embodiment 1 from above.
Figure 5:
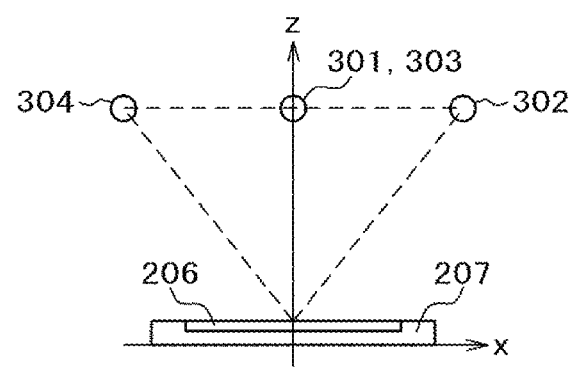
FIG. 5 is a side view of the detectors and the sample wafer placed on the stage when viewing the arrangement of the detectors of the image-capturing apparatus according to Embodiment 1 from the side.

Arrangement of the detectors 209 of the image-capturing apparatus 103 will be described with reference to FIGS. 3 to 5. FIG. 3 is a view schematically illustrating the positional relationship between detectors 301 to 305 and the sample wafer 206 on the stage 207. FIG. 4 is a view when viewing FIG. 3 from above (positive direction of a Z axis), and FIG. 5 is a view when viewing FIG. 3 from the side (negative direction of a Y axis) (the detector 305 is not illustrated).

Here, the detectors 301 to 304 represent the plurality of detectors configured to selectively detect electrons having a specific emission angle. For example, the detector 301 represents the detector for detecting the electrons emitted from the sample wafer 206 in the positive direction of the y axis. In addition, the split-type detector described in JP-A-1-304647 may be used as the detector.

In addition, the detector 305 (not illustrated in FIGS. 4 to 5) represents the detector for detecting the secondary electrons emitted from the sample. Although the apparatus including five detectors is described as an example for simplicity in the following description, the invention is applicable to other arrangements of the detectors and is applicable to the case where the number of detectors increases.

Figure 6:
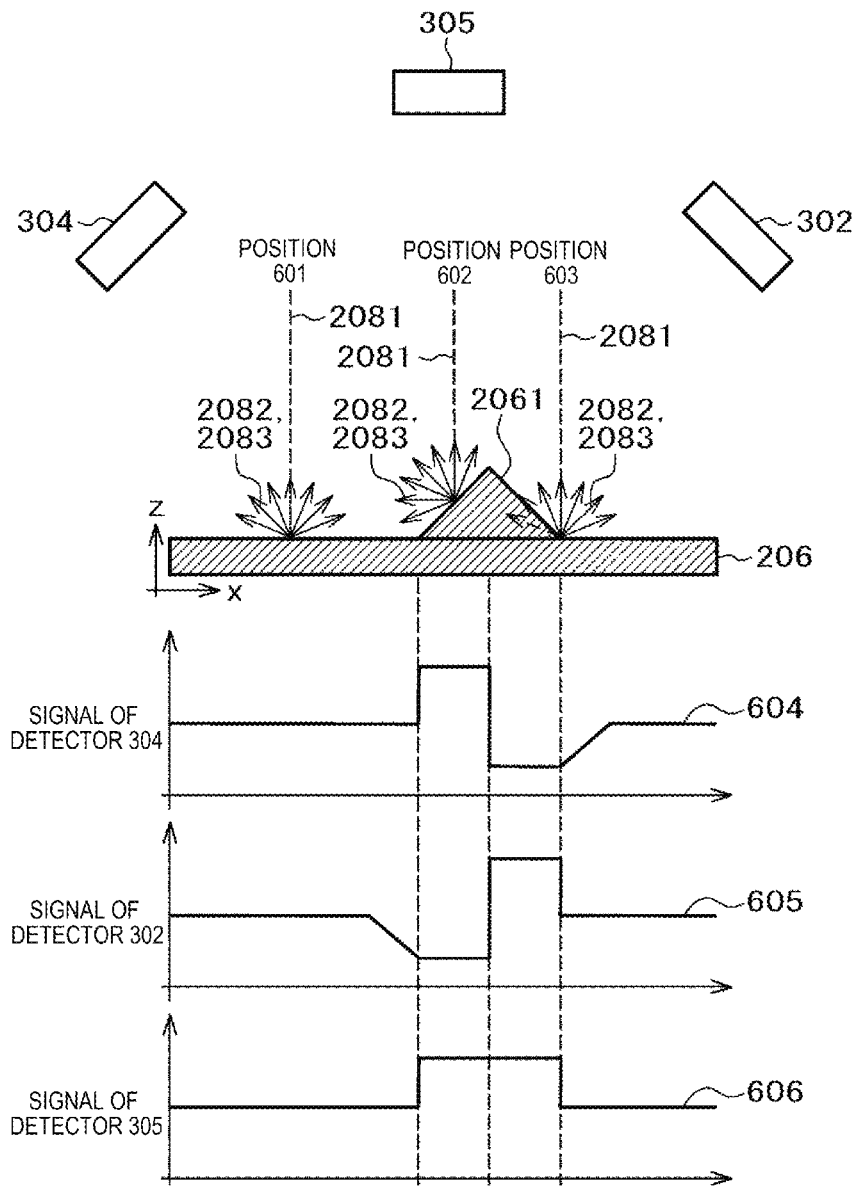
FIG. 6 is a side view of the detectors including the cross section of the sample wafer to explain the relation between emission angles of electrons and the detection signal and a view illustrating an example of a detection signal waveform of each detector obtained when electron beams are scanned on the sample wafer according to Embodiment 1 of the invention.

The relationship between the emission angle of the electrons and the detection signal will be described using FIG. 6. When the primary electron beams 2081 irradiated from the electron source 208 reach the surface of the sample wafer 206, the secondary electrons 2082 or reflected electrons 2083 are emitted in all directions (arrows in the figure) at a flat portion of the sample wafer 206 such as a position 601. Therefore, when the primary electron beams 2081 are irradiated onto the position 601 of the sample wafer 206, the intensities of the detection signals 604 to 606 in the detectors 302 to 304 are approximately the same.

When the sample wafer 206 is not flat, deviation occurs in the angle of the emitted electrons. For example, if the left side of the convex part 2061 of the sample wafer 206 at a position 602 is inclined, since the amount of secondary electrons 2082 or reflected electrons 2083 emitted to the left side of the irradiation position of the primary electron beams 2081 increases as compared to the case of the flat surface of the position 601, the detection signal 604 of the detector 304 disposed at the left side becomes strong. Meanwhile, since the amount of secondary electrons 2082 or reflected electrons 2083 emitted to the right side decreases, the detection signal 605 of the detector 302 disposed at the right side becomes low.

On the other hand, at the position 603 of the bottom of the inclined surface of the right side of the convex part 2061 of the sample wafer 206, the sample wafer 206 is flat at the irradiation position of the primary electron beams 2081, but the emitted electrons are shielded by the adjacent convex part 2061, such that the amount of secondary electrons 2082 or reflected electrons 2083 reaching the detector 304 disposed at the left side is reduced, and, thus, the detection signal 604 is reduced.

In the detectors 301 to 304 configured to selectively detect electrons having specific emission angles, images are shaded due to irregularities of the surface of the sample. These detector images are also referred to as shadow images because a shadow is observed as if applying light from the direction in which the detector is disposed on the image. Hereinafter, in the shadow image, a region having high brightness is referred to as a bright region and a region having low brightness is referred to as a dark region in the shadow generated by irregularities of the surface of the sample.

The detector 305 located at the upper side mainly detects the secondary electrons 2082, and the detection signal 606 is changed by a difference in the emission amount of the secondary electrons 2082 due to edge effects, thereby generating image shade. The detection signals 604 to 606 schematically illustrate the signal profiles of the detectors when the primary electron beams 2081 are scanned to the positions 601 to 603 of the sample wafer 206.

Figure 7A:
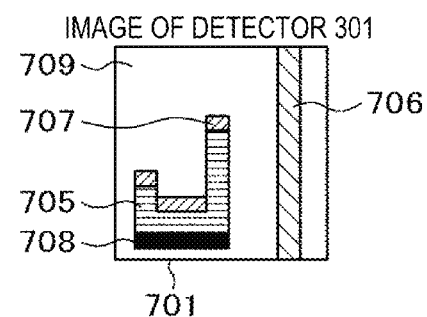
FIG. 7A illustrates a shadow image obtained by a detector 301 of the image-capturing apparatus according to Embodiment 1 of the invention.
Figure 7B:
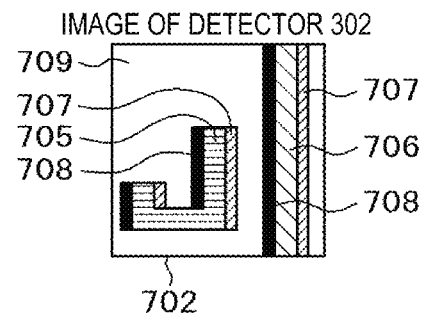
FIG. 7B illustrates a shadow image obtained by a detector 302 of the image-capturing apparatus according to Embodiment 1 of the invention.
Figure 7C:
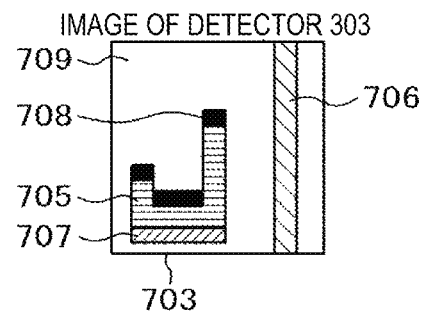
FIG. 7C illustrates a shadow image obtained by a detector 303 of the image-capturing apparatus according to Embodiment 1 of the invention.
Figure 7D:
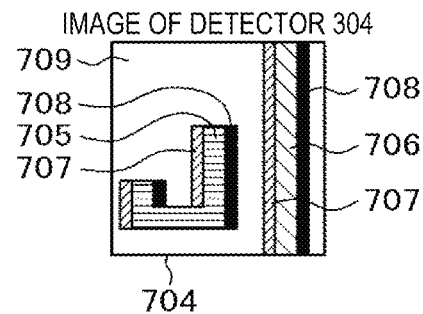
FIG. 7D illustrates a shadow image obtained by a detector 304 of the image-capturing apparatus according to Embodiment 1 of the invention.
Figure 7E:
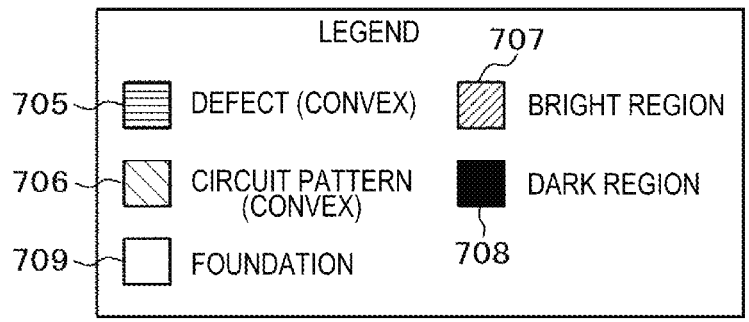
FIG. 7E is a view illustrating the legend of the patterns illustrated in FIGS. 7A to 7D which illustrate the shadow images obtained by the detectors 301 to 304 of the image-capturing apparatus according to Embodiment 1 of the invention.

FIGS. 7A to 7D schematically illustrate the shadow directions of the images of the plurality of channels captured by the detectors 301 to 304. FIG. 7E describes what are indicated by the patterns illustrated in FIGS. 7A to 7D. The images 701 to 704 of FIGS. 7A to 7D are images captured by the detectors 301 to 304, respectively, in which a convex defect 705 and a convex circuit pattern 706 at the same place on the sample are captured. In addition, in FIGS. 7A to 7D, the positions of a bright region 707 and a dark region 708 on the images 701 to 704 are illustrated.

Figure 8:
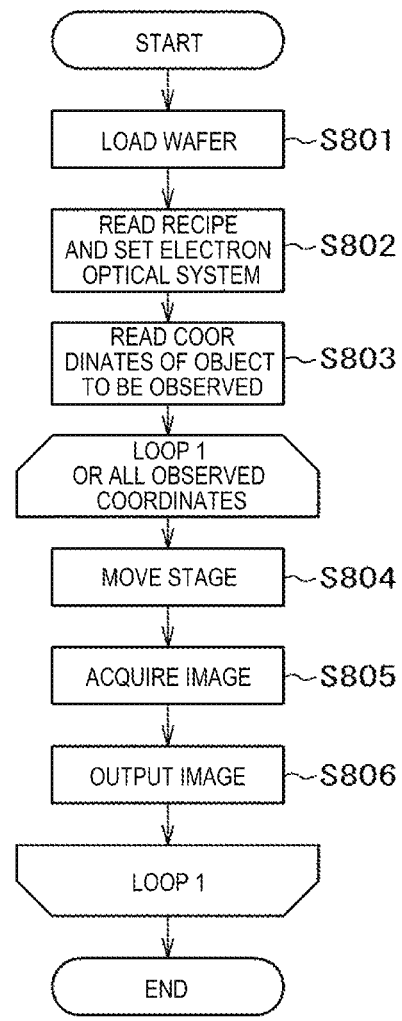
FIG. 8 is a flowchart illustrating the flow of a process relating to image capturing by the image-capturing apparatus according to Embodiment 1 of the invention.

Next, operation of the image-capturing apparatus 103 illustrated in FIGS. 1 and 2 will be described using the flowchart of FIG. 8. First, the sample wafer 206 to be observed is loaded on the stage 207 (S801); and a recipe in which an image capturing condition (acceleration voltage, probe current or the like) is stored is read from the recipe storage unit 216, and the electron optical system is set according to the read condition (S802). Next, the coordinates of the object to be observed, which are stored in the coordinate storage unit 217, are read (S803).

The subsequent processes S804 to S806 are performed to the read coordinates of the object to be observed. First, the stage 207 is controlled using the stage control unit 212 to move the stage, such that the coordinates of the object to be observed are included in the field of view (S804).

Next, the electron optical system, which is not illustrated, is controlled using the beam scan control unit 213 to scan the primary electron beams 2081 in the field of view, and the secondary electrons 2082 or the reflected electrons 2083 emitted from the sample wafer 206 are detected by the plurality of detectors 209. The signals detected by the plurality of detectors 209 are respectively imaged by the imaging unit 211 to obtain images of a plurality of channels (S805).

The obtained images of the plurality of channels are output by the input/output interface unit 204 (S806). In addition, various instructions from the operator or the settings of the capturing condition are performed via the input/output unit 210 including the keyboard, the mouse, the display or the like.

Figure 9:
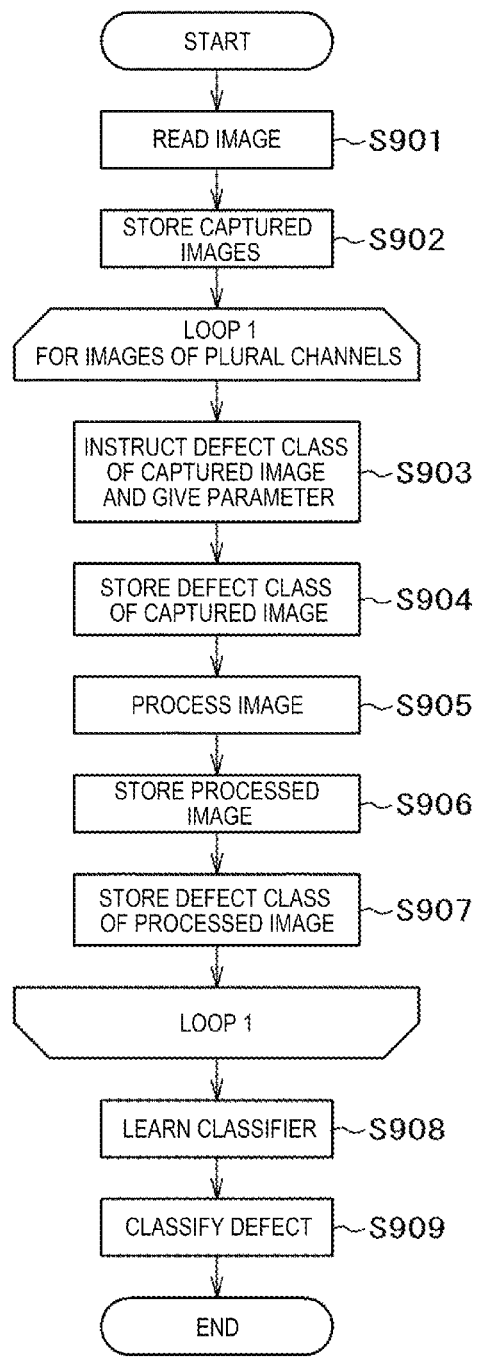
FIG. 9 is a flowchart illustrating the flow of a process relating to defect classification by a defect classification apparatus according to Embodiment 1 of the invention.

Operation of the defect classification apparatus 101 illustrated in FIG. 1 will be described using the flowchart of FIG. 9.

First, the images of the plurality of channels output from the image-capturing apparatus 103 are read by using the input/output interface unit 108 (S901), and the read images of the plurality of channels are stored in the image storage unit 109 as captured images based on the channel information accompanying the images (S902).

The subsequent processes S903 to S907 are performed to the images of the plurality of channels obtained by capturing the image of the same place. First, the defect classes of the images of the plurality of channels stored in the image storage unit 109 as the captured images are instructed and parameters for processing the images are provided (S903). The instructed defect classes are stored in the defect class storage unit 110 (S904), and the images of the plurality of channels are processed by the image processing unit 112 (S905). Details of the image processing process (S905) will be described below.

Next, the images of the plurality of channels processed by the image processing unit 112 are stored in the image storage unit 109 as the processed images based on the channel information accompanying the images respectively (S906), and the defect classes of the processed images of the plurality of channels are stored in the defect class storage unit 110 (S907).

Next, the classifier for classifying the defect classes of the images is learned by the classifier learning unit 113 using the captured images and the processed images stored in the image storage unit 109, and the defect classes stored in the defect class storage unit 110 (S908) and the captured images stored in the image storage unit 109 are classified by the image classification unit 114 using the learned classifier (S909).

As the classifier learning process (S908) of the classifier learning unit 113, two processes including a feature amount extraction process and a classifier construction process are performed to the images to be learned.

In the feature amount extraction process, first, after a defect portion is recognized from at least one of the captured images or the processed images stored in the image storage unit 109, the feature amount obtained by numeralizing the unevenness state or shape of the defect, brightness or the like is calculated.

In the classifier construction process, the classifier such as a neural network, a support vector machine, or the like is constructed using the feature amount obtained by the feature amount extraction process. In addition, instructions such as various types of instructions from the operator or instructions of the defect classes are performed through the input/output unit 107 including the keyboard, the mouse, the display or the like.

In addition, as the image classification process (S909), two processes including the above-described feature amount extraction process and the pattern recognition process are performed to the images to be classified.

The pattern recognition process calculates a probability that an image to be classified falls in each defect class using the feature amount obtained by the feature amount extraction process and the classifier constructed by the classifier learning process (S908), and sets a classification class having a highest probability as a classification result.

In the pattern recognition process, when the probability of falling in the plurality of classification classes is the same or when the probability of falling in any classes is low, it may be unknown in which defect classes the image falls. Thus, in this case, "unknown defect class" is set as the classification result.

Details of image processing process (S905) will be described using FIG. 10.

First, whether a parameter p1 indicating whether to rotate an image to be processed is 1 is determined based on the parameter for processing the image given in (S903) (S1001), and, when the parameter p1 is 1, the image is rotated (S1002). Next, whether a parameter p2 indicating whether to invert the image to be processed is 1 is determined (S1003), and when the parameter p2 is 1, the image is inverted (S1004). Next, whether a parameter p3 indicating whether to perform a defect class unchangeable deformation process of performing deformation in which the defect class of the image is not changed to the image to be processed is 1 is determined (S1005) and, when the parameter p3 is 1, the image is subjected to the defect class unchangeable deformation process (S1006).

The defect class unchangeable deformation process (S1006) is arbitrary deformation in which the defect class of the image is not changed by deformation, and is, for example, a process of distorting an entire image, a process of performing minute deformation only to a defect portion of the image, a process of changing the contrast of the whole or part of the image, or the like.

Figure 10:
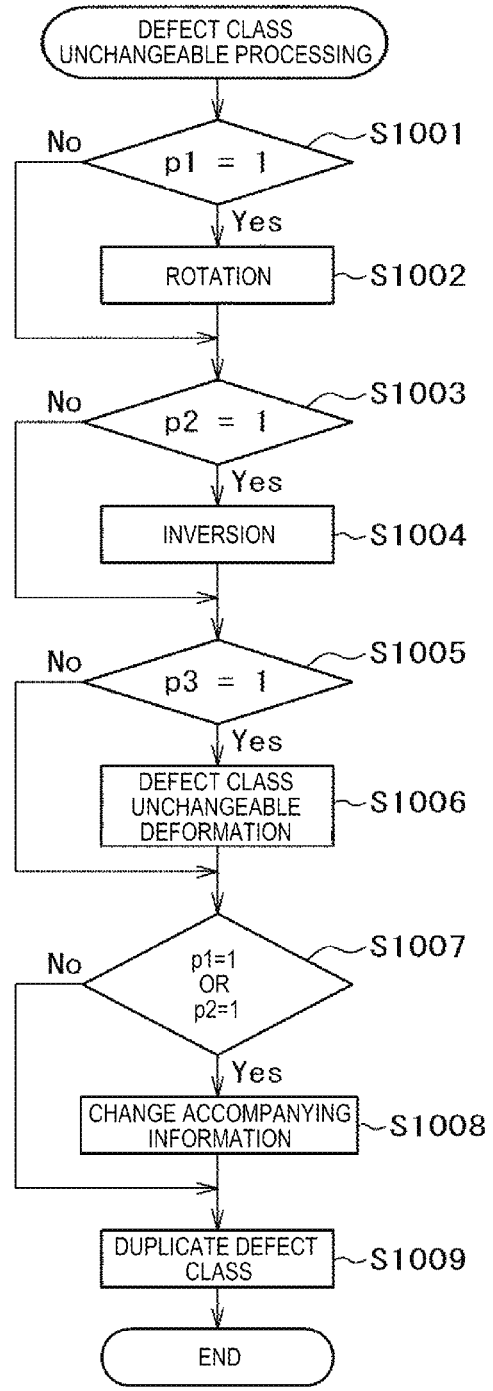
FIG. 10 is a flowchart illustrating the flow of an image processing process by the defect classification apparatus according to Embodiment 1 of the invention.

In addition, although the processing order of the rotation process S1002, the inversion process S1004 and the defect class unchangeable deformation process S1006 are illustrated in FIG. 10, the order of three processes is arbitrary. For example, the processes may be performed in order of the process S1005, the defect class unchangeable deformation process S1006, the process S1001, the rotation process S1002, the process S1003 and the inversion process S1004. In addition, when all the parameters p1, p2 and p3 are not 1, the subsequent processes S1007 to S1010 and S906 and S907 do not need to be performed.

Next, whether p1 or p2 is 1 is determined (S1007), and if p1 or p2 is 1, the channel information accompanying the image subjected to the rotation process or the like is renewed according to the rotation process and the inversion process performed to the captured image (S1008). The accompanied information renewing process (S1008) will be described below. Next, the defect class of the processed image becomes equal to the defect class of the captured image (S1009).

FIGS. 13A to 13D are views illustrating the images of the plurality of channels obtained only by rotating the images 701 to 704 (the image of the detector 305 is not illustrated) of the plurality of channels illustrated in FIGS. 7A to 7D by 90 degrees in a clockwise direction. The images 1301 to 1304 illustrated in FIGS. 13A to 13D are images obtained by rotating the images 701 to 704 of FIGS. 7A to 7D by 90 degrees in the clockwise direction. Although the example of rotating the images by 90 degrees is illustrated in FIGS. 13A to 13D, the rotation direction may be a counterclockwise direction, and the rotation angle may not be 90 degrees.

FIGS. 14A to 14D are views illustrating the images of the plurality of channels obtained by only horizontally inverting the images 701 to 704 (the image of the detector 305 is not illustrated) of the plurality of channels illustrated in FIGS. 7A to 7D. The images 1401 to 1404 illustrated in FIGS. 14A to 14D are images obtained by horizontally inverting the images 701 to 704 of FIGS. 7A to 7D. Although the example of horizontally inverting the image is illustrated as the inversion process in FIGS. 14A to 14D, a process of inverting the image against an arbitrary straight line, such as vertical inversion, may be performed.

FIGS. 15A to 15D are views illustrating the images of the plurality of channels obtained only by performing defect class unchangeable deformation to the images 701 to 704 (the image of the detector 305 is not illustrated) of the plurality of channels illustrated in FIGS. 7A to 7D. In FIGS. 15A to 15D, for example, deformation for distorting the whole image is performed. The images 1501 to 1504 illustrated in FIGS. 15A to 15D are images obtained by performing defect class unchangeable deformation to the images 701 to 704 of FIGS. 7A to 7D.

The accompanied information renewing process (S1008) will be described using FIGS. 16 to 18. Here, as an example, the images of the plurality of channels are rotated by 90 degrees in the clockwise direction.

FIG. 16 is a view illustrating information 1600 accompanying the images 701 to 704 respectively captured by the detectors 301 to 304 and the image captured by the detector 305. In the example illustrated in FIG. 16, as information accompanying the captured images, an image type 1601 indicating whether an image type is a captured image or a processed image, a defect ID 1602 indicating the number of a detected defect, an image ID 1603 indicating an image corresponding to the defect ID 1602, channel information 1604 corresponding to the detector which captured the image, and image ID before processing 1605 indicating the ID of an image before processing or the like are illustrated.

Figures 17, 18, 19A:
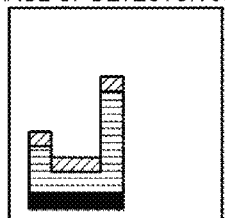
FIG. 17 is a table illustrating an example of accompanied information of a processed image immediately after rotation, inversion and deformation in the defect classification apparatus according to Embodiment 1 of the invention.
FIG. 18 is a table illustrating an example of accompanied information of a processed image after renewing accompanied information in the defect classification apparatus according to Embodiment 1 of the invention.
FIG. 19A illustrates an image obtained by extracting a defect portion from an image 701 obtained by the detector 301 in the defect classification apparatus according to Embodiment 2 of the invention.
Figure 19B:
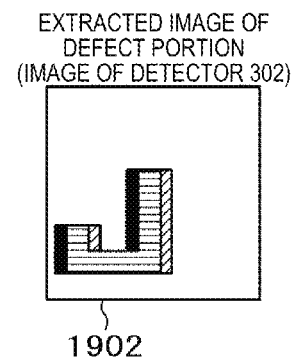
FIG. 19B illustrates an image obtained by extracting a defect portion from an image 702 obtained by the detector 302 in the defect classification apparatus according to Embodiment 2 of the invention.
Figure 19C:
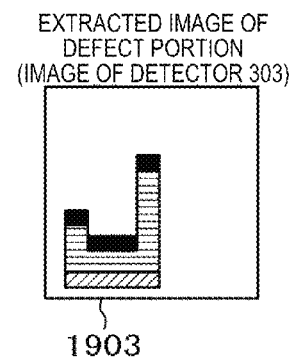
FIG. 19C illustrates an image obtained by extracting a defect portion from an image 703 obtained by the detector 303 in the defect classification apparatus according to Embodiment 2 of the invention.
Figure 19D:
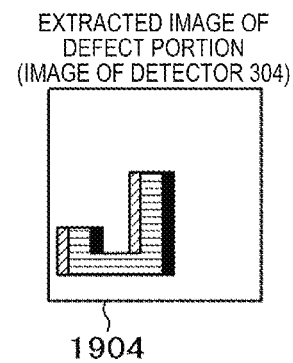
FIG. 19D illustrates an image obtained by extracting a defect portion from an image 704 obtained by the detector 304 in the defect classification apparatus according to the Embodiment 2 of the invention.

FIG. 17 illustrates the processed images as the image type 1701 and illustrates accompanied information 1700 of the images immediately after rotating the images, which image IDs before processing 1705 are "701", "702", "703", "704" and "705", corresponding to the channel information 1704, by 90 degrees in the clockwise direction, when the defect ID 1702 is D13. The IDs 1703 of the images obtained by rotating the images, which image IDs before processing 1705 are 701 to 705, are 1301 to 1305.

Here, when the images of the plurality of channels illustrated in FIGS. 7A to 7D are rotated by 90 degrees in the clockwise direction, the shadow directions of the images are changed as illustrated in FIGS. 13A to 13D. The shadow images of the images of the plurality of channels do not achieve consistency between the shadow directions of the images and the channel information 1704 accompanying the images by the changes in the shadow directions of the images. In this case, in the above-described classifier learning process and the feature amount extraction process in the defect classification process, the feature amount such as the unevenness state of the defect calculated based on the shadow directions of the images and the channel information accompanying the images is not correctly calculated. Therefore, the channel information accompanying the images is renewed between the images of the plurality of channels according to the rotation process and the inversion process performed to the images, such that the shadow directions of the images match the detection directions of the detectors.

FIG. 18 is a view illustrating accompanied information 1800 of the images after renewing the channel information 1804 accompanying the image such that the shadow directions of the images match the detection directions of the detectors when the image type 1801 is a processed image and the defect ID 1802 is D13. Here, in the column of the image ID 1803, the channel information 1804 accompanying the image of "1301" is renewed from the detector 301 to the detector 302. Similarly, the column of the image ID 1803 renews the channel information 1804 accompanying the images 1302 to 1304. The consistency between the shadow directions of the images and the channel information 1804 accompanying the images are achieved by the accompanied information renewing process (S1008). 1805 denotes the image ID before processing.

Figure 24:
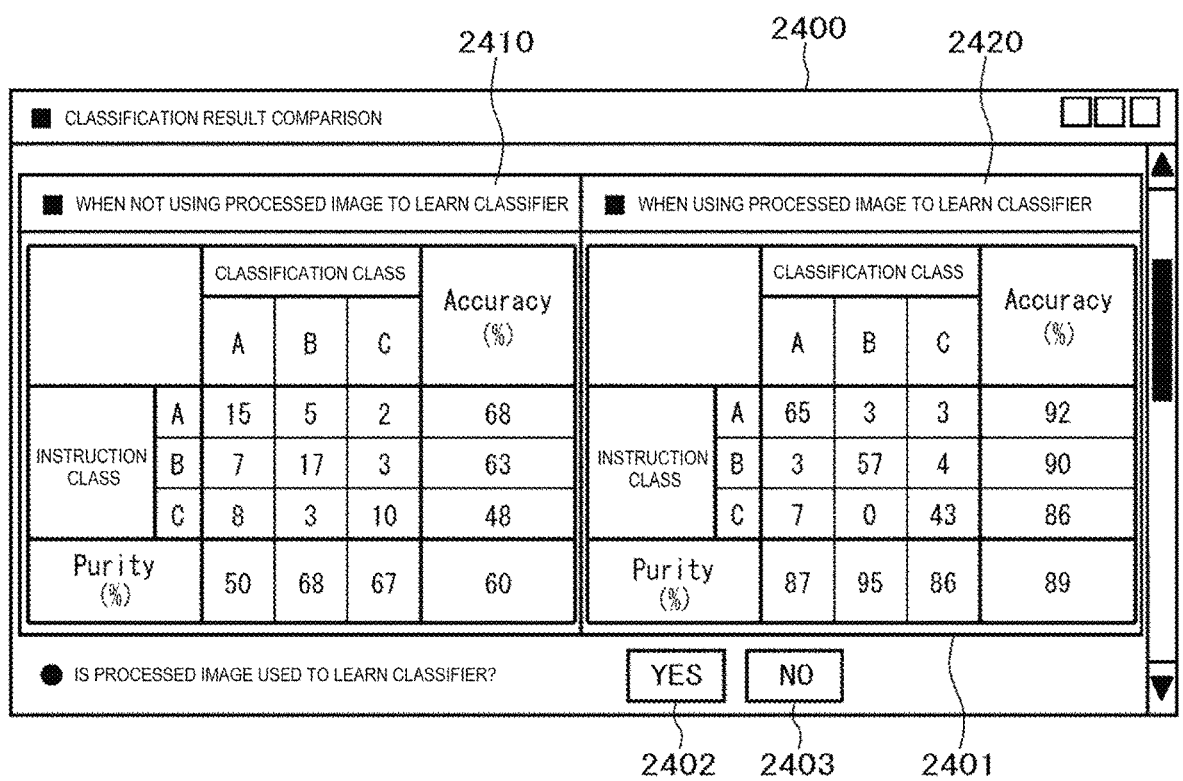
FIG. 24 is a front view of a screen illustrating an example of a screen for displaying results of classification in the defect classification apparatus according to Embodiment 1 of the invention.

FIG. 24 is a view illustrating an example of a screen 2400 on which the result of classifying the images stored in the image storage unit is displayed by the input/output unit 107. The screen 2400 includes a classification result display unit 2401, a YES button 2402, and a NO button 2103. In the classification result display unit 2401, a classification result 2410 when the processed image is not used to learn the classifier, and a classification result 2420 when the processed image is used to learn the classifier are displayed. Therefore, it is possible to compare a plurality of classification results at once. In addition, when the processed image is used to learn the classifier based on the displayed classification results 2410 and 2420, the YES button 2402 is clicked. On the other hand, when the processed image is not used to learn the classifier, the NO button 2403 is clicked. Therefore, it is possible to select one having high classification performance.

That is, in the present embodiment, defect images and reference images are subjected to the same rotation process or horizontal inversion process as a process performed to images in the classification apparatus of a defect image, and the detectors corresponding to the images are renewed and used as images for learning such that the shadow directions of the images subjected to the rotation or inversion process match the detection directions of the detectors of the image-capturing apparatus, thereby learning the classifier using images more than the images obtained in the image-capturing apparatus.

As described above, the images captured by the plurality of detectors 209 of the image-capturing apparatus 103 are subjected to a process not changing the defect class such as rotation or inversion process, and the images and the channel information accompanying the images are renewed according to processing to achieve consistency between the shadow directions of the images and the channel information accompanying the images, thereby increasing the number of images used for the classifier learning process (S908) and constructing the classifier having a higher performance.

Embodiment 2

Next, a defect classification apparatus for performing a processing process different from Embodiment 1 will be described. The configuration of the apparatus according to the present embodiment is the same as FIG. 1 illustrated in Embodiment 1. In addition, the processing flow is the same as FIG. 9. The difference is the processing method of the image processing process (S905). Hereinafter, only the portions different from Embodiment 1 will be described.

The defect class generated in the manufacturing line of the semiconductor wafers may be defined by the positional relationship between the defect and the circuit pattern. The present embodiment relates to a method of obtaining image data of the defect class different from the defect class of the captured images by processing captured images. Therefore, it is possible to increase the number of images of a defect class having a low occurrence frequency.

Figure 11:
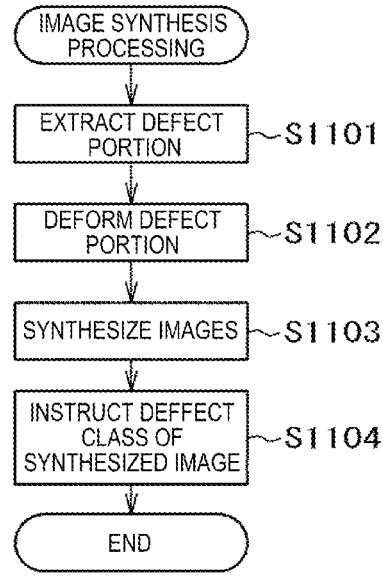
FIG. 11 is a flowchart illustrating the flow of an image processing process by a defect classification apparatus according to Embodiment 2 of the present invention.

A detailed processing flow will be described using FIG. 11. First, a defect portion is extracted from each of the captured images to be processed (S1101); the image, from which the defect portion is extracted, is subject to deformation such as extension or contraction or an aspect change or the like (S1102); the image obtained by the deformation process is synthesized with the images of the plurality of channels different from the images to be processed per channel (S1103); and the defect class of the image obtained by the synthesis process is instructed (S1104). The above-described processes S1101 to S1104 are performed by the image processing unit 112. In addition, various types of instructions from the operator or instructions of the defect class are performed through the input/output unit 107 including the keyboard, the mouse, the display or the like.

FIGS. 19A to 22D are views illustrating the processes S1101 to S1103 of the images 701 to 704 illustrated in FIGS. 7A to 7D. The images 1901 to 1904 of FIGS. 19A to 19D are images obtained by extracting defect portions from the images 701 to 704 illustrated in FIGS. 7A to 7D. The images 1905 to 1908 of FIGS. 20A to 20D are images obtained by deforming the images 1901 to 1904 of FIGS. 19A to 19D. FIGS. 21A to 21D illustrate examples of performing an aspect change as deformation.

Figure 20A:
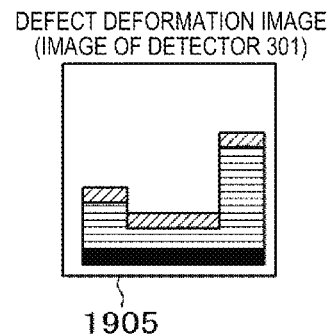
FIG. 20A illustrates an image obtained by performing an aspect change to an image obtained by extracting a defect portion from the image 701 obtained by the detector 301 in the defect classification apparatus according to Embodiment 2 of the invention.
Figure 20B:
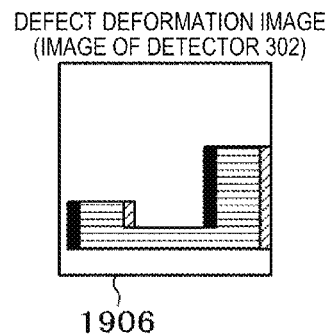
FIG. 20B illustrates an image obtained by performing an aspect change to an image obtained by extracting a defect portion from the image 702 obtained by the detector 302 in the defect classification apparatus according to Embodiment 2 of the invention.
Figure 20C:
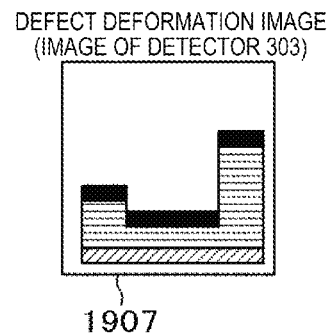
FIG. 20C illustrates an image obtained by performing an aspect change to an image obtained by extracting a defect portion from the image 703 obtained by the detector 303 in the defect classification apparatus according to Embodiment 2 of the invention.
Figure 20D:
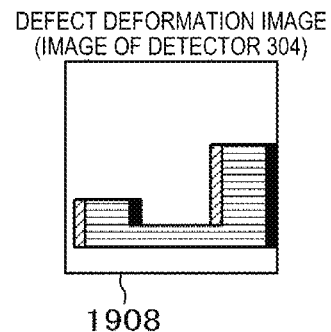
FIG. 20D illustrates an image obtained by performing an aspect change to an image obtained by extracting a defect portion from the image 704 obtained by the detector 304 in the defect classification apparatus according to Embodiment 2 of the invention.
Figure 21A:
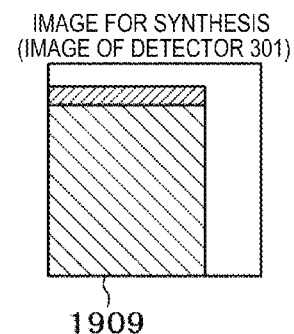
FIG. 21A illustrates an image for synthesis obtained from the image 701 obtained by the detector 301 in the defect classification apparatus according to Embodiment 2 of the invention.
Figure 21B:
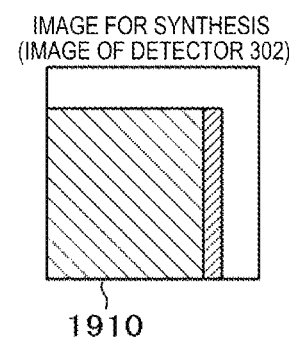
FIG. 21B illustrates an image for synthesis obtained from the image 702 obtained by the detector 301 in the defect classification apparatus according to Embodiment 2 of the invention.
Figure 21C:
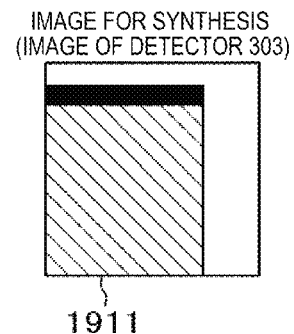
FIG. 21C illustrates an image for synthesis obtained from the image 703 obtained by the detector 301 in the defect classification apparatus according to Embodiment 2 of the invention.
Figure 21D:
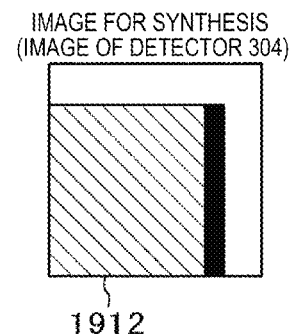
FIG. 21D illustrates an image for synthesis obtained from the image 704 obtained by the detector 301 in the defect classification apparatus according to Embodiment 2 of the invention.
Figure 22A:
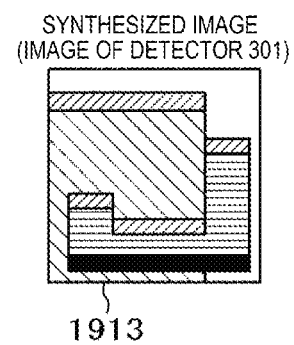
FIG. 22A illustrates a synthesized image obtained by synthesizing a defect-deformed image 1905 obtained by performing an aspect change to an image of a defect portion extracted from the image 701 obtained by the detector 301, and an image for synthesis 1909 in the defect classification apparatus according to Embodiment 2 of the invention.
Figure 22B:
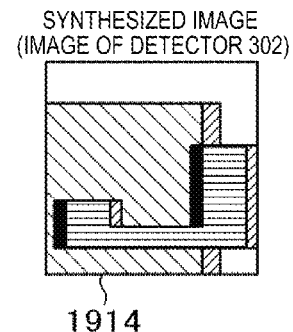
FIG. 22B illustrates a synthesized image obtained by synthesizing a defect-deformed image 1906 obtained by performing an aspect change to an image of a defect portion extracted from the image 702 obtained by the detector 302, and an image for synthesis 1910 in the defect classification apparatus according to Embodiment 2 of the invention.
Figure 22C:
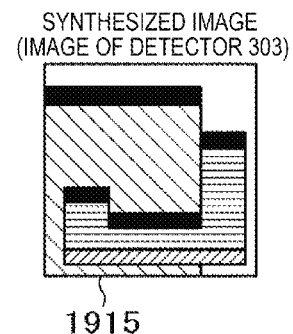
FIG. 22C illustrates a synthesized image obtained by synthesizing a defect-deformed image 1907 obtained by performing an aspect change to an image of a defect portion extracted from the image 703 obtained by the detector 303, and an image for synthesis 1911 in the defect classification apparatus according to Embodiment 2 of the invention.
Figure 22D:
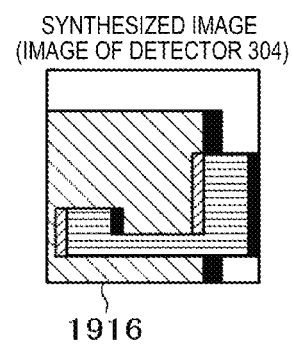
FIG. 22D illustrates a synthesized image obtained by synthesizing a defect-deformed image 1908 obtained by performing an aspect change to an image of a defect portion extracted from the image 704 obtained by the detector 304, and an image for synthesis 1912 in the defect classification apparatus according to Embodiment 2 of the invention.

In addition, the images 1901 to 1912 of FIGS. 21A to 21D are images of the plurality of channels different in the capturing position, from the images 701 to 704 illustrated in FIGS. 7A to 7D, which are stored in the image storage unit 109, and the image 1913 of FIGS. 22A to 22D is an image obtained by synthesizing the image 1905 of FIG. 20A and the image 1909 of FIG. 21A. The images 1914 to 1916 of FIGS. 22B to 22D are images obtained by the same synthesis of FIGS. 20B to 20D and FIGS. 21B to 21D. The image of the defect class different from the captured image can be created by the processes S1101 to S1103.

Figure 23:
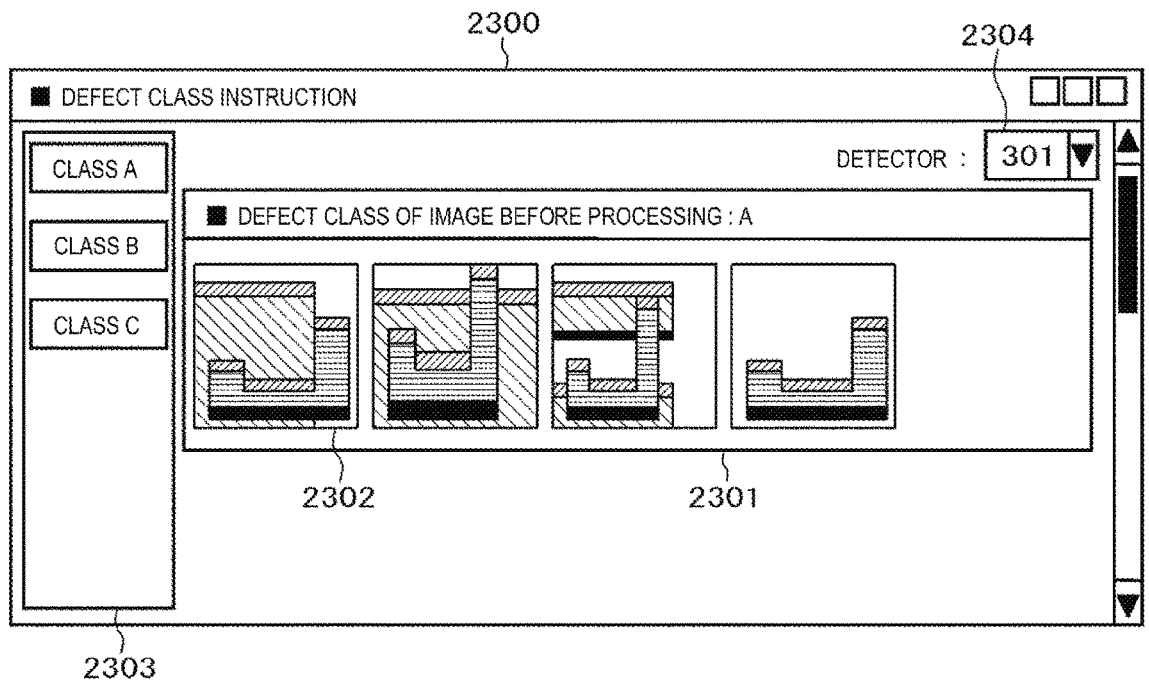
FIG. 23 is a front view of a screen illustrating an example of screens for displaying images obtained by the image synthesis process in the defect classification apparatus according to Embodiment 2 of the invention.

FIG. 23 is a view illustrating an example of a screen 2300 on which images obtained by the image synthesis process S1103 are displayed by the input/output unit 107. The screen 2300 includes an image display unit 2301, a defect class selection unit 2303 and a display image selection unit 2304. In the image display unit 2301, the image obtained by the image synthesis process S1103 is displayed as an image called a thumbnail, which is obtained by contraction and iconization of the image (thumbnail image 2302). Therefore, it is possible to observe a plurality of images at once.

In the defect class selection unit 2303, there is a button for selecting the defect class of the images obtained by the image synthesis process S1103. When the thumbnail image 2302 is clicked, and the button in the defect class selection unit 2303 is clicked or the thumbnail image 2302 is dragged and dropped to the button in the defect class selection unit 2303, the defect class of the images becomes the defect class displayed in the button. In addition, the display image selection unit 2304 serves to select the channel of the image displayed as the thumbnail image, thereby displaying the images of a desired channel by the operator.

That is, in the present embodiment, since a defect part is extracted from the image including defects, which is obtained by capturing the sample with the image-capturing apparatus, the image of the defects is deformed, the image of the defects or the defect image subjected to the deformation process and the reference image are synthesized to generate a learning image, and the variations of the learning image are increased by creating the learning images having different defect shapes or different backgrounds.

As described above, by creating the image of the defect class different from the captured images, it is possible to increase the number of images used for the classifier learning process (S908) and to construct the classifier having a higher performance, similarly to Embodiment 1.

Embodiment 3

Although, in Embodiment 1 and Embodiment 2, the example that performs the defect class unchangeable processing and the image synthesis processing is illustrated as the processing process, respectively, the case of performing the two processing methods will be described in Embodiment 3. That is, in the present embodiment, processes are performed according to the processing flow of FIGS. 8 and 9 described in Embodiment 1 and the method described using the flowchart of FIG. 10 in Embodiment 1 and the method described using the flowchart of FIG. 11 in Embodiment 2 are performed in the image processing (S905) of FIG. 9.

Figure 12:
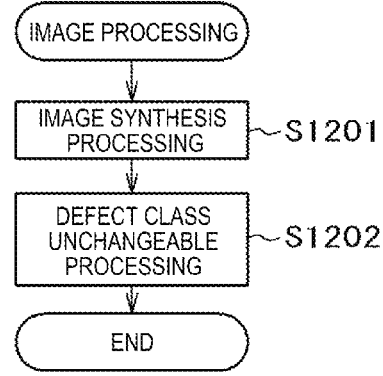
FIG. 12 is a flowchart illustrating the flow of an image processing process by a defect classification apparatus according to Embodiment 3 of the present invention.
Figure 13A:
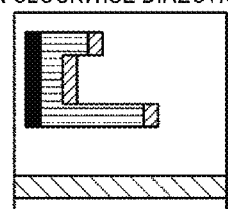
FIG. 13A illustrates an image illustrating an example of the result of performing a rotation process to an image of the detector 301 in the defect classification apparatus according to Embodiment 1 of the invention.
Figure 13B:
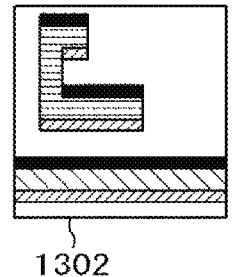
FIG. 13B illustrates an image illustrating an example of the result of performing a rotation process to an image of the detector 302 in the defect classification apparatus according to Embodiment 1 of the invention.
Figure 13C:
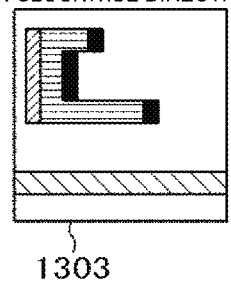
FIG. 13C illustrates an image illustrating an example of the result of performing a rotation process to an image of the detector 303 in the defect classification apparatus according to Embodiment 1 of the invention.
Figure 13D:
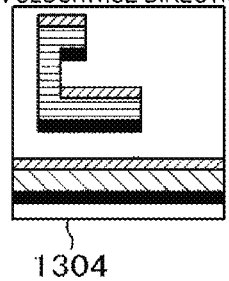
FIG. 13D illustrates an image illustrating an example of the result of performing a rotation process to an image of the detector 304 in the defect classification apparatus according to Embodiment 1 of the invention.
Figure 14A:
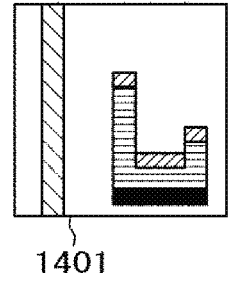
FIG. 14A illustrates an image illustrating an example of the result of performing an inversion process to an image of the detector 301 in the defect classification apparatus according to Embodiment 1 of the invention.
Figure 14B:
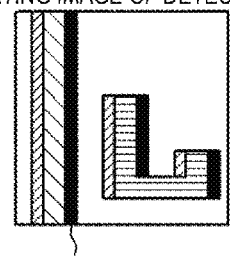
FIG. 14B illustrates an image illustrating an example of the result of performing an inversion process to an image of the detector 302 in the defect classification apparatus according to Embodiment 1 of the invention.
Figure 14C:
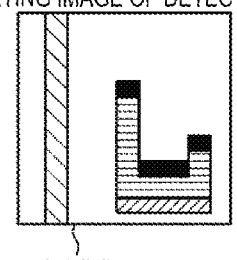
FIG. 14C illustrates an image illustrating an example of the result of performing an inversion process to an image of the detector 303 in the defect classification apparatus according to Embodiment 1 of the invention.
Figure 14D:
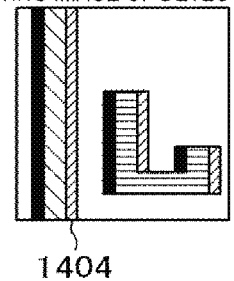
FIG. 14D illustrates an image illustrating an example of the result of performing an inversion process to an image of the detector 304 in the defect classification apparatus according to Embodiment 1 of the invention.
Figure 15A:
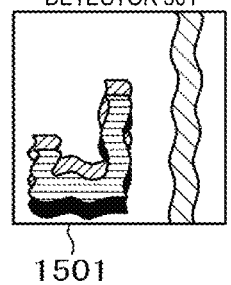
FIG. 15A illustrates an image illustrating an example of the result of performing defect class unchangeable deformation to an image of the detector 301 in the defect classification apparatus according to Embodiment 1 of the invention.
Figure 15B:
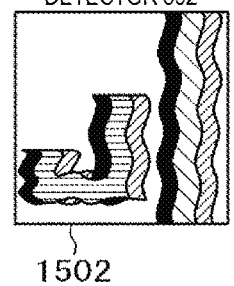
FIG. 15B illustrates an image illustrating an example of the result of performing defect class unchangeable deformation to an image of the detector 302 in the defect classification apparatus according to Embodiment 1 of the invention.

FIG. 12 is a flowchart of a processing process when the methods described in the two embodiments are performed. First, the image synthesis processing process described in the flowchart of FIG. 11 in Embodiment 2, wherein the defect class may change, is performed (S1201), and then the defect class unchangeable processing process described in the flowchart of FIG. 10 in Embodiment 1, wherein the defect class is not changed, is performed (S1202). Here, although the image synthesis process (S1201) and the defect class unchangeable processing process (S1202) are performed in this order in FIG. 12, it may be performed in order of the defect class unchangeable processing process (S1202) and the image synthesis processing process (S1201) by changing the order.

REFERENCE SIGNS LIST

101: defect classification apparatus
103: image-capturing apparatus
109: image storage unit
110: defect class storage unit
112: image processing unit
113: classifier learning unit
114: image classification unit
206: sample wafer
301 to 305: charged particle detector
S905: image processing process
S906: processed image storage process
S907: processed image defect class storage process
S1008: accompanied information renewing process
S1009: defect class duplication process
S1103: image synthesis process
S1104: synthesized image defect class instruction process

The invention claimed is:

1. A defect classification apparatus comprising:
an image storage unit for storing images of a sample;
a defect class storage unit for storing types of defects included in the images of the sample;
an image processing unit for processing the images of the sample and generating a plurality of images; and
a classifier learning unit for learning a defect classifier using the images of the sample and the plurality of images, wherein
the image processing unit performs any of a rotation process, a horizontal inversion process or a class unchangeable deformation process, which is performed while the type of a defect image is unchanged or performs a combination thereof to the images of the sample, and generates the plurality of images, and
the channel information accompanying the plurality of generated images is renewed according to the rotation process or the inversion process.

2. The defect classification apparatus according to claim 1, wherein
the image processing unit performs any of a rotation process, an inversion process or a class unchangeable deformation process, which is performed while the type of defect image is unchanged or performs a combination thereof to the extracted images of defects, performs any of extension, contraction or an aspect change or performs a combination thereof to the extracted images of defects, and generates new images of defects from the extracted images of defects.

3. The defect classification apparatus according to claim 1, wherein
the classifier learning unit further includes a selection unit for selecting whether the data of the plurality of generated defect images is used to learn the defect classifier.

4. A defect classification method comprising steps of:
storing images of a sample in an image storage unit;
storing types of defects included in the images of the sample in a defect class storage unit;
processing the images of the sample and generating a plurality of images; and
learning a defect classifier in a classifier learning unit by using the images of the sample and the plurality of images, wherein
an image processing unit performs any of a rotation process, a horizontal inversion process or a class unchangeable deformation process, which is performed while the type of a defect image is unchanged or performs a combination thereof to the images of the sample and generates the plurality of images, and
the channel information accompanying the plurality of generated images is renewed according to the rotation process or the inversion process.

5. The defect classification method according to claim 4, wherein
the processing of the extracted images of defects to generate the plurality of defect images by the image processing unit is conducted by performing any of a rotation process, an inversion process or a class unchangeable deformation process, which is performed while the type of defect image is unchanged or performing a combination thereof to the extracted images of defects, and performing any of extension, contraction or an aspect change or performing a combination thereof to the extracted images of defects to generate new images of defects from the extracted images of defects.

6. The defect classification method according to claim 4, wherein
whether the data of the plurality of generated defect images is used to learn the defect classifier by the classifier learning unit is selected by a selection unit.

* * * * *

UNITED STATES PATENT AND TRADEMARK OFFICE
CERTIFICATE OF CORRECTION

PATENT NO. : 10,810,733 B2  
APPLICATION NO. : 16/090991  
DATED : October 20, 2020  
INVENTOR(S) : Naoaki Kondo et al.

Page 1 of 1

It is certified that error appears in the above-identified patent and that said Letters Patent is hereby corrected as shown below:

On the Title Page

At item (71), Lines 1 and 2, please delete "HITACHI HIGH-TECHNOLOGIES CORPORATION" and insert therefor --HITACHI HIGH-TECH CORPORATION--.

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*